United States Patent [19]
Loop

[11] Patent Number: 6,157,383
[45] Date of Patent: Dec. 5, 2000

[54] CONTROL POLYHEDRA FOR A THREE-DIMENSIONAL (3D) USER INTERFACE

[75] Inventor: Charles T. Loop, Seattle, Wash.

[73] Assignee: Microsoft Corporation, Redmond, Wash.

[21] Appl. No.: 09/106,445

[22] Filed: Jun. 29, 1998

[51] Int. Cl.[7] ....................................... G06F 15/00
[52] U.S. Cl. ............................................. 345/419
[58] Field of Search ........................... 345/419, 427, 345/474, 157, 158, 356, 357

[56] References Cited

U.S. PATENT DOCUMENTS

| | | | |
|---|---|---|---|
| 5,146,557 | 9/1992 | Yamrom et al. | 345/121 |
| 5,592,599 | 1/1997 | Lindholm | 345/427 |
| 6,008,814 | 12/1999 | Baldwin et al. | 345/427 |

*Primary Examiner*—Phu K. Nguyen
*Attorney, Agent, or Firm*—Schwegman, Lundberg, Woessner & Kluth, P.A.

[57] ABSTRACT

A user interface for a three-dimensional (3D) environment is comprised of a pointer and a control polyhedra. Movement of the pointer is controlled by a pointing device, such as a mouse or trackball. The control polyhedra has at least one visible face and each visible face is parallel to a plane of the three-dimensional environment. Selection of the visible face using the pointing device moves the control polyhedra in the plane parallel to the visible face.

29 Claims, 9 Drawing Sheets

CONTROL POLYHEDRA FOR A THREE-DIMENSIONAL (3D) USER INTERFACE

FIELD OF THE INVENTION

This invention relates generally to three-dimensional (3D) user interfaces, and more particularly to a control polyhedra for such interfaces.

BACKGROUND OF THE INVENTION

Graphical user interfaces have become standard fare on most computers sold today. For example, versions of the Microsoft Windows operating system provide a graphical user interface in which a pointer is positionable over windows on a screen via an input device such as a mouse or a trackball. When such a user interface is used in a two-dimensional (2D) context, movement of two-dimensional objects within the user interface is intuitive, and commonly performed: a user positions the pointer over an object using the mouse, clicks a button on the mouse (thereby selecting the object), and moves the mouse, which causes the object to be dragged across the screen in accordance with movement of the mouse, until the user releases the mouse button.

The movement of two-dimensional objects within a user interface is intuitive using a pointing device because movement of the pointing device is easily mapped to the corresponding two-dimensional plane of the screen itself. For example, moving a mouse to the right while an object is selected causes the object to be moved to the right. As another example, moving the mouse up while the object is selected causes the object to be moved up. Pointing devices typically only permit indication of movement within a two-dimensional plane. Because a user interface is also usually used within a two-dimensional context □ i.e., the screen within which the user interface exists being a two-dimensional plane □ using a pointing device to move objects in an intuitive manner within the user interface is easily accomplished.

However, user interfaces such as those provided by operating systems like versions of the Microsoft Windows operating system are also increasingly being used to operate in a three-dimensional (3D) context. Although the screen is still a two-dimensional plane, a third dimension may be approximated by giving objects within the user interface an illusory depth. Thus, an object, besides being able to be moved up, down, left and right, may also be portrayed in such a manner that it can be moved forward (towards the user looking at the screen) or backward (away from the user looking at the screen).

Two-dimensional pointing devices do not, however, provide intuitive control of such objects within a three-dimensional user interface. Because the pointing devices can only indicate movement within a two-dimensional plane, there is no natural mapping of movement of these pointing devices to a user interface within a three-dimensional context. Particularly, while a typical pointing device such as a mouse may be able to intuitively control movement of a three-dimensional object in two dimensions—such as within planes parallel to the screen—it does not provide for intuitive control of the object in the third dimension, such as within planes not necessarily parallel to the screen. Thus, there is a need for providing such two-dimensional pointing devices intuitive capability to control movement of a three-dimensional object within a three-dimensional user interface.

SUMMARY OF THE INVENTION

The above-mentioned shortcomings, disadvantages and problems are addressed by the present invention, which will be understood by reading and studying the following specification. One aspect of the invention is a user interface for a three-dimensional (3D) environment. The user interface includes a pointer and a control polyhedra. Movement of the pointer is controlled by a pointing device, such as a mouse or a trackball. The control polyhedra has at least one visible face; each visible face is parallel to a plane embedded within the three-dimensional environment. Selection of the visible face using the pointer permits subsequent movement of the control polyhedra in the plane of the three-dimensional environment to which the visible face is parallel.

Thus, the invention permits a user to intuitively use a two-dimensional pointing device to control an object within a three-dimensional user interface. When the user selects a given face of the control polyhedra, movement of the pointing device is mapped to a plane of movement that is parallel to the selected face. The user is therefore able to move the object in one plane at a time. By selecting different faces of the control polyhedra, the user is able to move the control polyhedra through all three dimensions of the user interface.

The present invention includes computerized systems, user interfaces, computers, operating systems, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, an overview of the invention is presented. In the third section, different embodiments of the invention are given. In the fourth section, applications for which various embodiments of the invention may be used are described. Finally, in the fifth section, a conclusion of the detailed description is provided.

Hardware and Operating Environment

Figure 1:
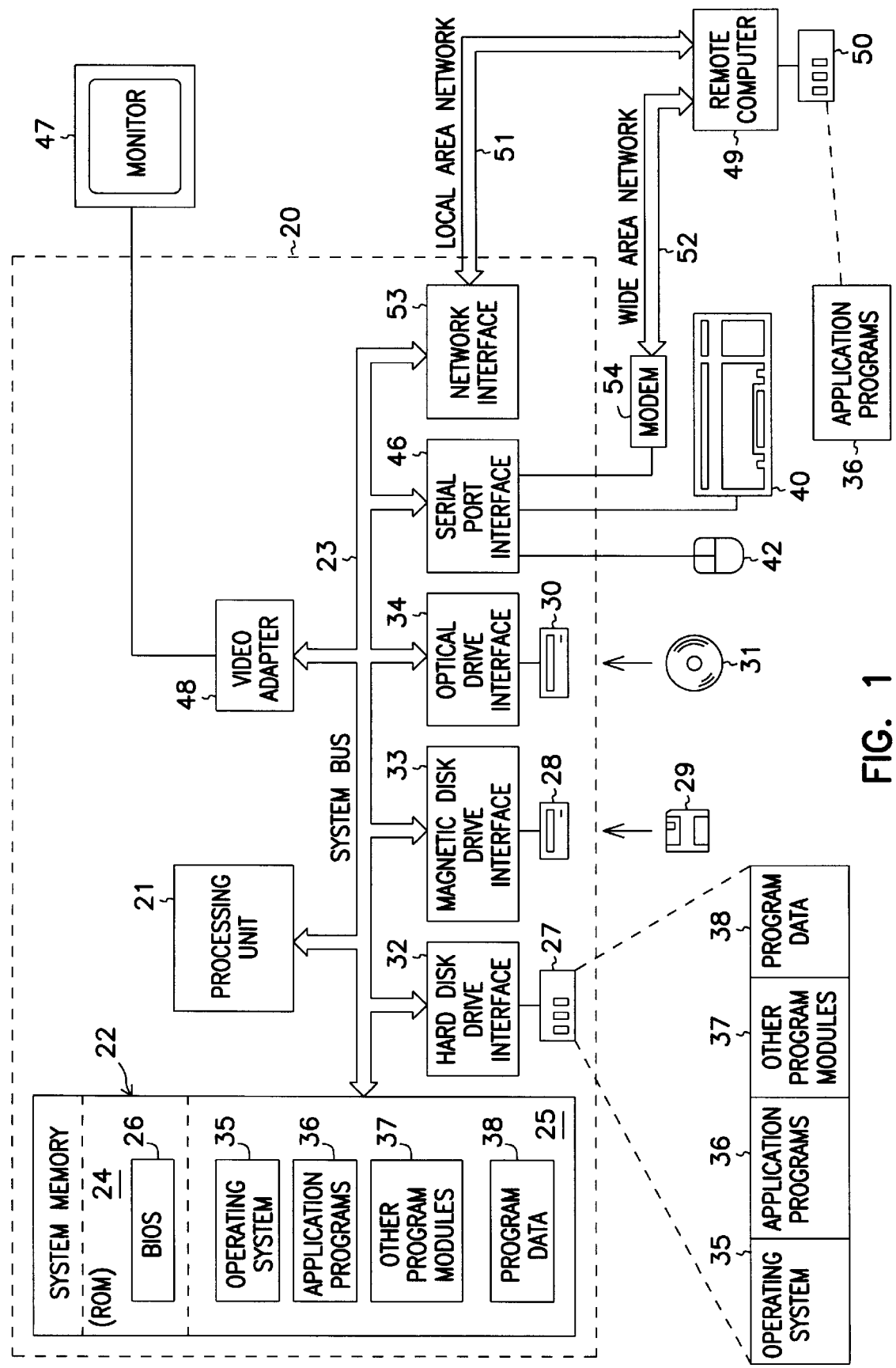
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Such pointing devices may include a mouse, a trackball, a wheel, a touch pad, etc.; the invention is not so limited. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory.

Overview of the Invention

An overview of an exemplary embodiment of the invention is described by reference to FIGS. 2(a)–2(d). The user interface of FIGS. 2(a)–2(d) may be implemented as part of an operating system, such as versions of the Microsoft Windows operating system. The user interface may also be part of a computerized system including a pointing device, such as a mouse, trackball, touch pad, etc. A computer program stored on a computer-readable medium, such as a floppy disk or a compact-disc read-only-memory (CD-ROM), may also provide the user interface.

Figure 2A:
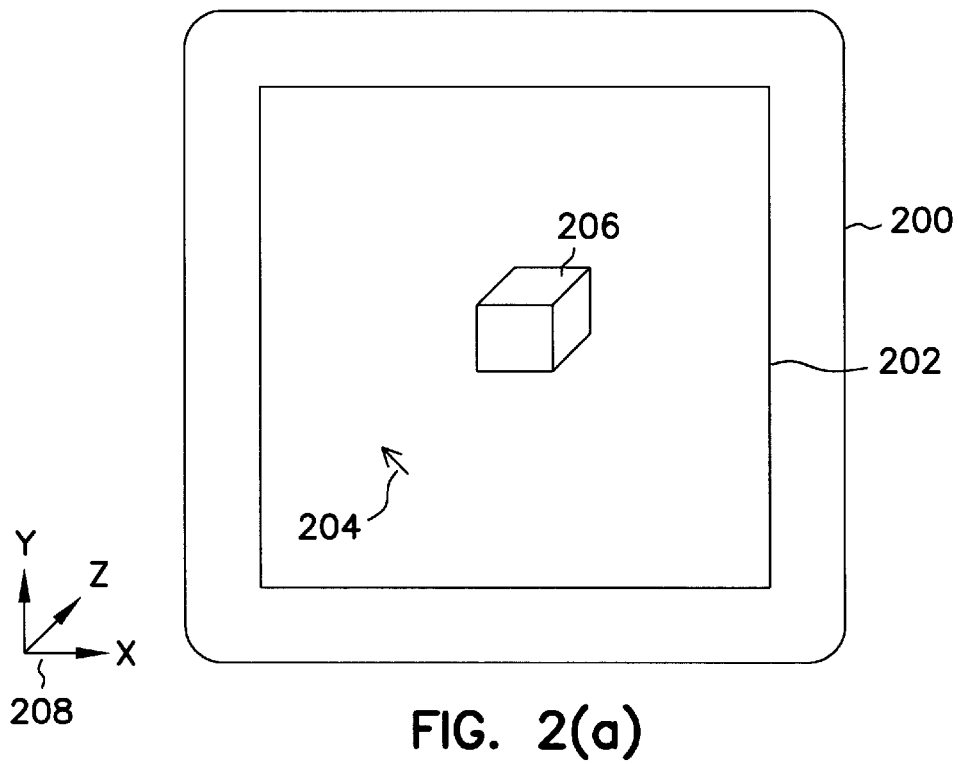
FIGS. 2(a) through 2(d) show diagrams that provide an overview of the invention.

As shown in FIG. 2(a), the three-dimensional user interface is displayed on screen 202 of display 200. Pointer 204 is controlled by a pointing device; that is, movement of the pointing device causes corresponding movement of pointer 204. Control polyhedra 206 is movable within the three dimensions shown on axis 208, that is, control polyhedra 206 may be moved in accordance with the X, Y, and Z axes. The invention is not limited as to the shape of control polyhedra 206. As shown in FIG. 2(a), control polyhedra 206 is a cube, having three visible faces, and three hidden faces (not visible in FIG. 2(a)). However, depending on the orientation in which the three-dimensional environment of FIG. 2(a) is viewed, only one face of control polyhedra 206 may be visible. Furthermore, other shapes that control polyhedra 206 may be include other polyhedra, for example, those having more than six faces.

Figure 2B:
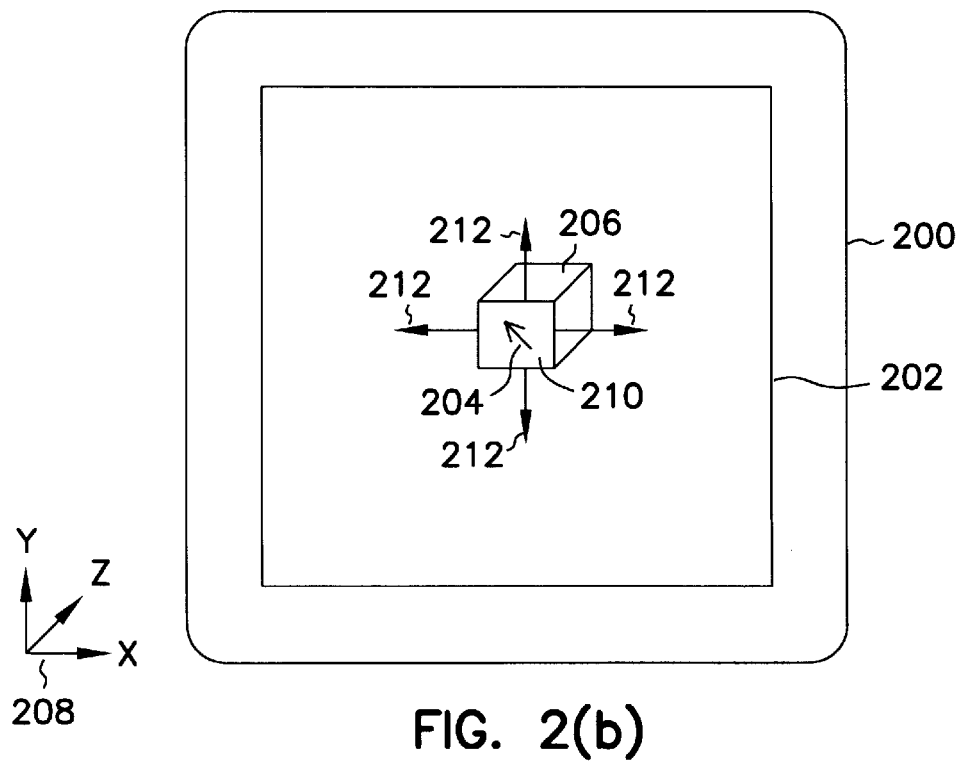

Referring to FIG. 2(b), pointer 204 has been moved over face 210 of control polyhedra 206. Face 210, because of the positioning of pointer 204 thereover, is considered the active face. If the object is selected while the pointer is so positioned, for example, by pressing a button on the pointing device, subsequent movement of the control polyhedra is permitted in a plane embedded within the three dimensional environment to which face 210 is parallel. Permissible movement is indicated in FIG. 2(b) by arrows 212. Thus, the two-dimensional plane of movement of the pointing device is mapped to the two-dimensional plane of movement spanned by the X and the Y axes of axis 208. Moving the pointing device to the left, for instance, causes movement in the negative X direction; moving the pointing device to the right causes movement in the positive X direction; moving the pointing device up causes movement in the positive Y direction; and, moving the pointing device down causes movement in the negative Y direction.

Figure 2C:
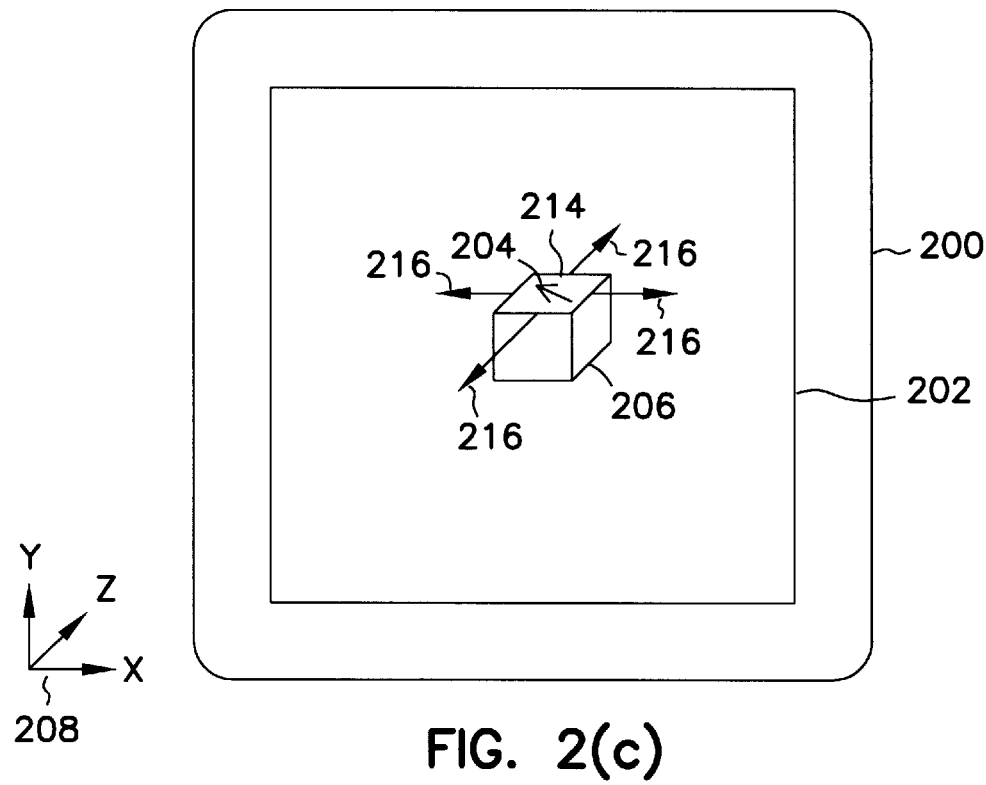

Referring next to FIG. 2(c), pointer 204 has been moved over face 214 of control polyhedra 206. Face 214 is now considered the active face. Upon the object being selected while pointer 204 is over face 214, subsequent movement of the control polyhedra is permitted in the plane of movement to which face 214 is parallel. Permissible movement is indicated in FIG. 2(c) by arrows 216. Thus, the two-dimensional plane of movement of the pointing device is mapped to the two-dimensional plane of movement spanned by the X and Z axes of axis 208. Moving the pointing device to the left, for instance, causes movement in the negative X direction; moving the pointing device to the right causes movement in the positive X direction; moving the pointing device up causes movement in the positive Z direction; and, moving the pointing device down causes movement in the negative Z direction.

Figure 2D:
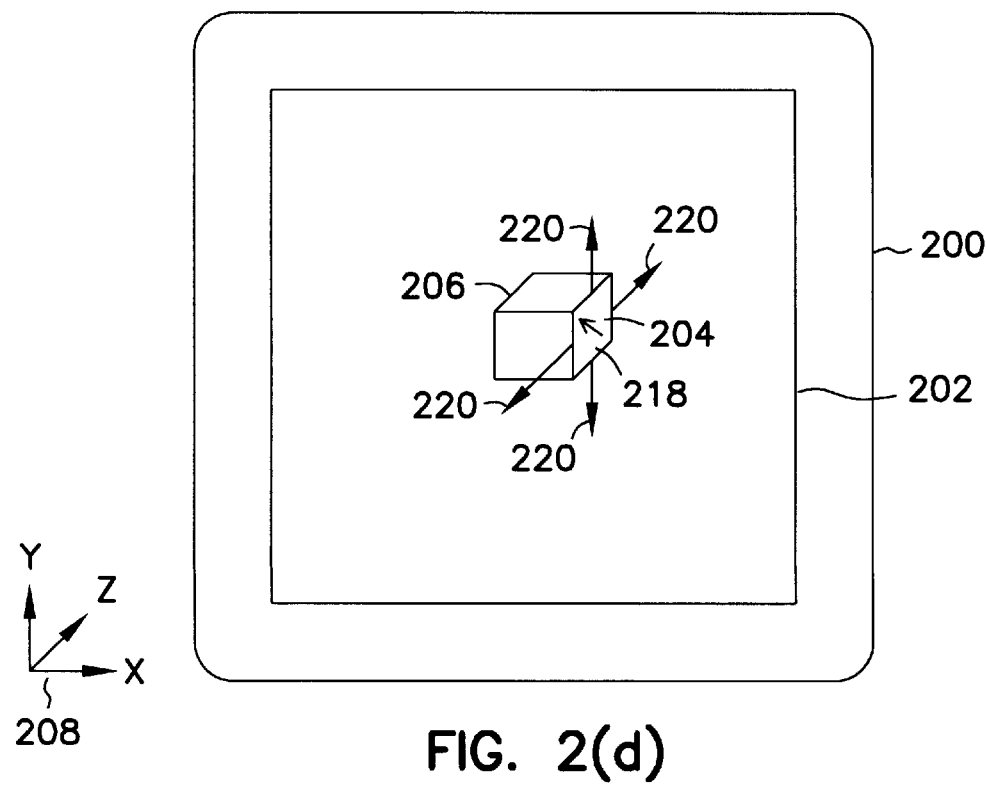

Referring finally to FIG. 2(d), pointer 204 has been moved over face 218 of control polyhedra 206. Face 220 is now the active face. Upon the object being selected while pointer 204 is over face 218, subsequent movement of the control polyhedra is permitted in the plane of movement to which face 218 is parallel. Thus, the two-dimensional plane of movement of the pointing device is mapped to the two-dimensional plane of movement spanned by the Y and Z axes of axis 208. Moving the pointing device to the left, for instance, causes movement in the negative Z direction; moving the pointing device to the right causes movement in the positive Z direction; moving the pointing device up causes movement in the positive Y direction; and, moving the pointing device down causes movement in the negative Y direction.

Thus, as described with reference to FIGS. 2(a)–2(d), the invention provides for a control polyhedra, such that selection of a visible face using a pointer permits subsequent movement of the control polyhedra in a plane to which the visible face is parallel. The invention therefore provides an intuitive manner by which the two-dimensional plane of movement of a pointing device may be mapped to movement of an object within three dimensions. The immediate plane of movement of the object, and to which the plane of movement of the pointing device corresponds, is a plane of movement parallel to the active visible face of the object. By switching the active visible face of the object, by moving the pointer over a different visible face, a user is thus able to move the control polyhedra within all three dimensions, even though the pointing device can itself only provide directional indication across two dimensions.

An overview of the invention has been provided. Those of ordinary skill within the art will appreciate that the invention may be implemented within a user interface provided by an operating system, such as versions of the Microsoft Windows operating system, that may be utilized in a three-dimensional context. The user interface may also be provided by a computer program (which itself may be an operating system) that is stored on a computer-readable media, and/or may be a part of a computerized system including a pointing device.

Alternative Embodiment of the Invention

Figure 3A:
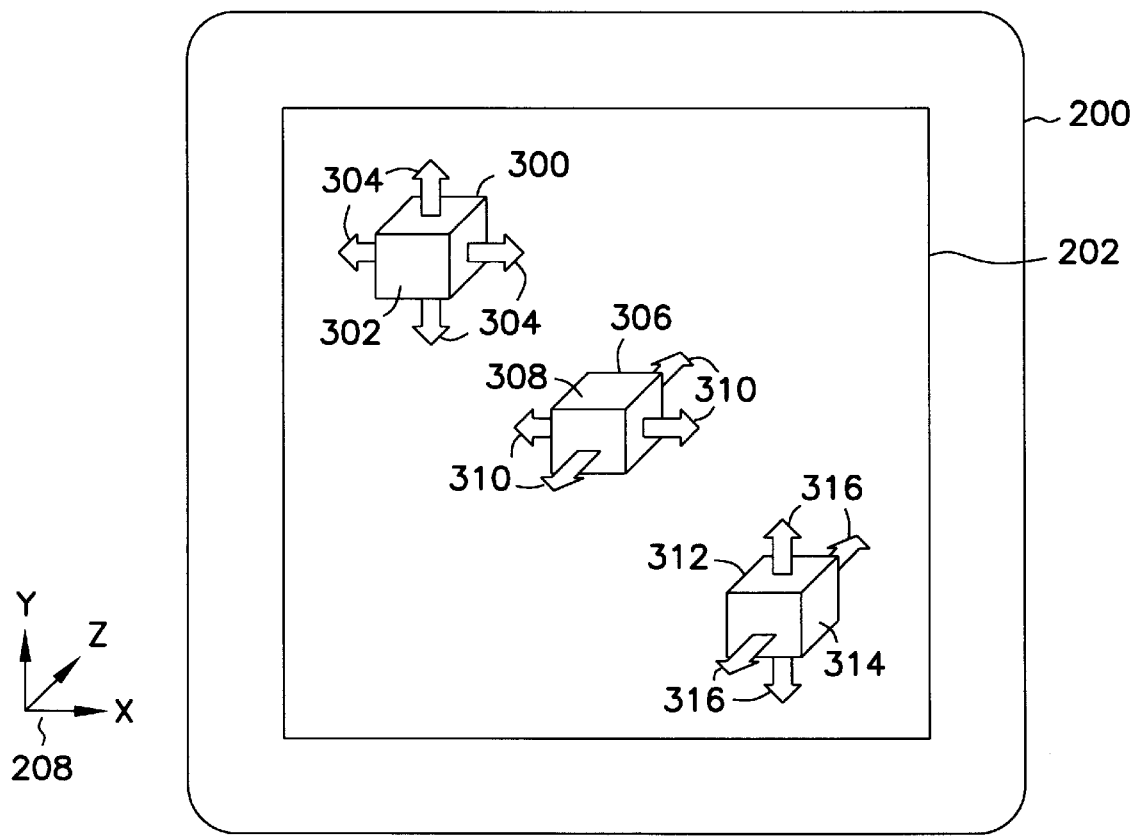
FIGS. 3(a) through 3(d) show diagrams of alternative embodiments of the invention; and, FIGS. 4(a) through 4(c) show exemplary applications for which embodiments of the invention may be used.
Figure 3B:
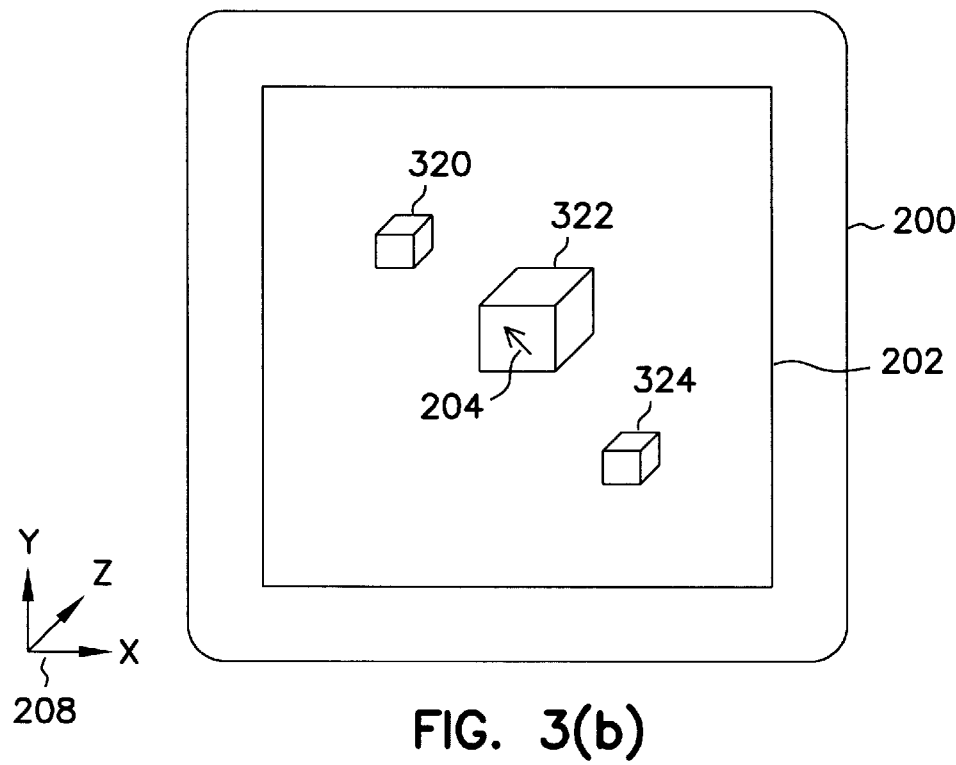
Figure 3C:
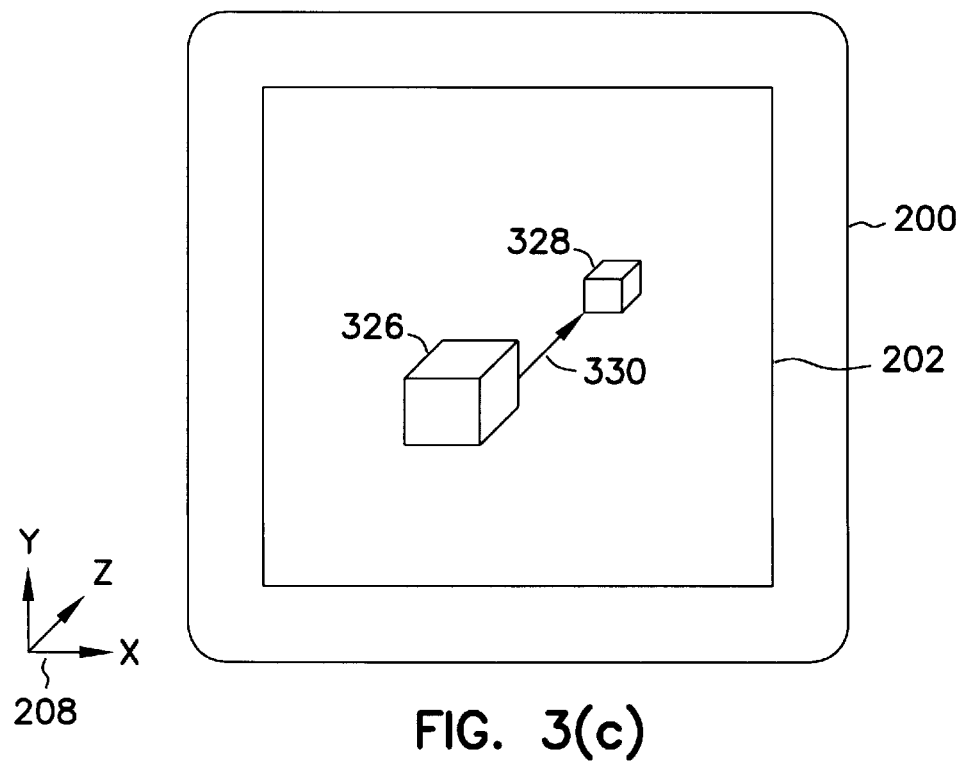
Figure 3D:
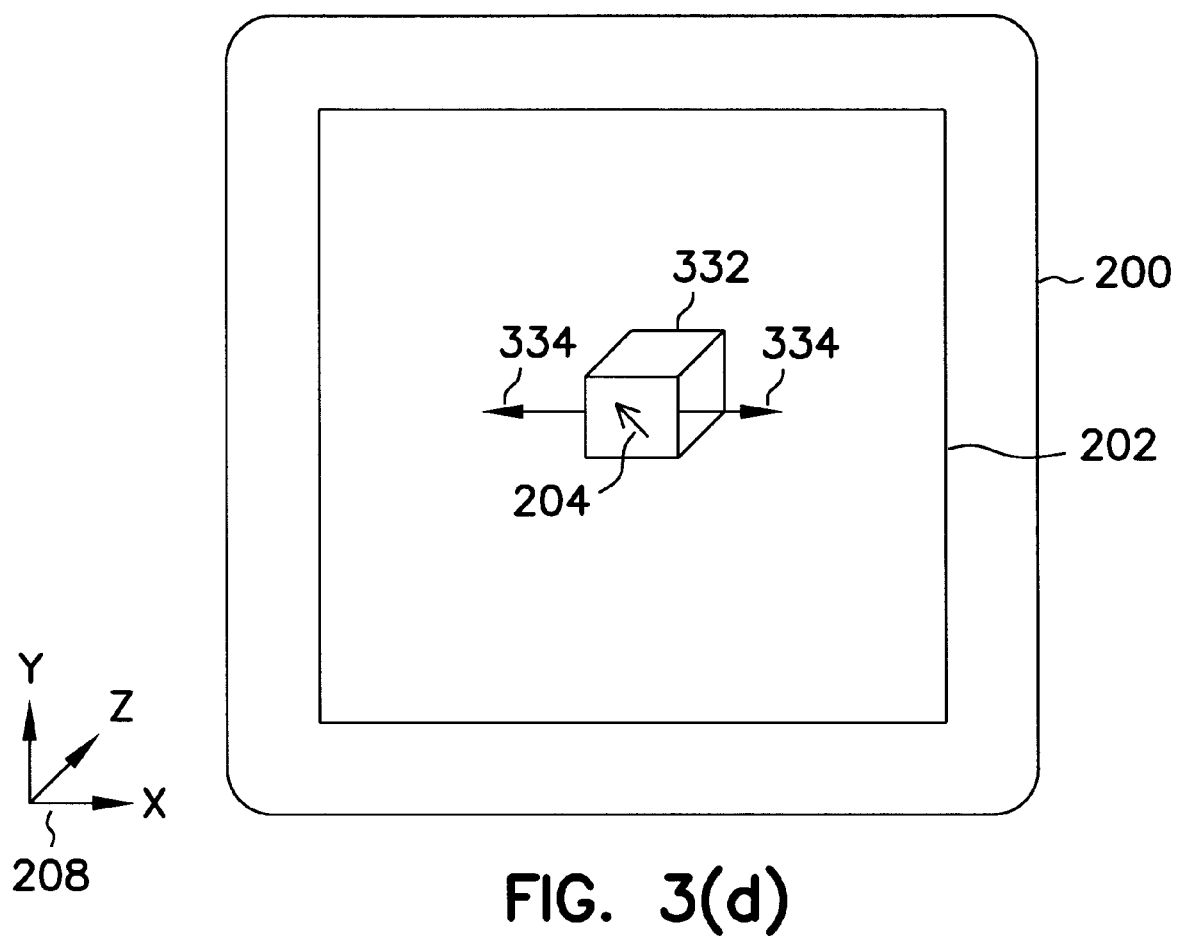

In the previous section, an overview of an exemplary embodiment of the invention was described. In this section, alternative embodiments of the invention are shown. Referring first to FIG. 3(a), an alternative embodiment is shown in which arrows extend from an active control polyhedra to indicate to the user the directions in which the control polyhedra may be moved, for the user's benefit. Thus, if control polyhedra 300 is the active control polyhedra, such that face 302 is the active face of this object, arrows 304 extend in the X and Y directions of axis 208 to indicate that control polyhedra 300 may be moved in a plane spanning the X and Y axes. Arrows 304 thus include two sets of two arrows each: a first set of two arrows parallel to the selected (active) visible face (face 302) and extending from two of the hidden faces perpendicular to the selected visible face, and a second set of two arrows parallel to the selective visible face and extending from two of the visible faces perpendicular to the selected visible face.

Conversely, if control polyhedra 306 of FIG. 3(a) is the active control polyhedra, such that face 308 is the active face of this object, arrows 310 extend in the X and Z directions of axis 208 to indicate that control polyhedra 306 may be moved within a plane spanning the X and Z axes. Arrows 310 thus also include two sets of two arrows each: a first set of two arrows parallel to the selected (active) visible face and extending from two of the hidden faces perpendicular to the selected visible face, and a second set of two arrows parallel to the selective visible face and extending from two of the visible faces perpendicular to the selected visible face.

Finally, if control polyhedra 312 is the active object, such that face 314 is the active face, arrows 316 extend in the Y and the Z directions of axis 208 to indicate that object 312 may be moved within a plane spanning the Y and Z axes. Arrows 316 also include two sets of two arrows each: a first set of two arrows parallel to the selected (active) visible face and extending from two of the hidden faces perpendicular to the selected visible face, and a second set of two arrows parallel to the selective visible face and extending from two of the visible faces perpendicular to the selected visible face.

Referring next to FIG. 3(*b*), an alternative embodiment is shown in which a control polyhedra has a default size, and a selected size when a visible face of the object is selected (made active) using the pointer (i.e., the pointer is positioned over the object). This enables the user to more easily identify the active object. Thus, pointer 204 is positioned over a face of control polyhedra 322, such that the control polyhedra is the active object, and has a selected size that is bigger than the default sizes of control polyhedras 320 and 324, which are inactive and unselected. The alternative embodiment of FIG. 3(*b*) compares with another embodiment of the invention in which the size of the control polyhedra remains constant regardless of whether it is active or not.

Referring next to FIG. 3(*c*), an alternative embodiment is shown in which a control polyhedra has a size that varies according to its movement within one particular plane of movement of a three-dimensional environment. This may provide the user a more satisfying illusion of three dimensions within a two-dimensional screen of a display. Thus, the control polyhedra of FIG. 3(*c*) is moved from a position 326 to a position 328, as indicated by arrow 330. This movement is in the positive Z direction, as measured against the Z axis of axis 208. Because the Z direction of the environment portrayed in FIG. 3(*c*) corresponds to depth, movement in the positive Z direction means that the object is moving away from the user, and thus the objects size becomes smaller. The alternative embodiment of FIG. 3(*c*) compares with another embodiment of the invention in which the size of the control polyhedra remains constant regardless of movement of the control polyhedra.

Typically, the selection of a face of an object permits movement of the object in a plane of movement parallel to the face. However, more precise movement, across a line within this plane, may be desirable. This is shown in the alternative embodiment of FIG. 3(*d*). Pointer 204 is positioned over a face of object 332, such that typically object 332 may be subsequently moved within a plane spanned by the X and Y axes of axis 208. However, as indicated by arrows 334, object 332 may instead only be moved in a line within this plane, and more specifically as shown in FIG. 3(*d*), a line in the same direction as the X axis of axis 208. The invention is not limited to a particular line, for example, within FIG. 3(*d*), the line could have also been in the same direction as the Y axis, or have been in any other direction within the plane spanned by the X and Y axes of axis 208. This line-directional movement mode, in which movement of the control polyhedra is constrained to a line within the plane of movement of the selected visible face of the object, may be selected by pressing a key on the keyboard, such as ALT, SHIFT, or CONTROL, while selecting the visible face of the object.

Alternative embodiments of the invention have been shown and described. In one alternative embodiment, arrows emanate from the object to indicate to the user in which directions the object may be moved, for the benefit of the user. In another alternative embodiment, an object becomes larger once it is selected. In still another alternative embodiment, an object's size varies according to its movement across one axis, such as the Z axis. Finally, in another alternative embodiment, an object is only movable across a specific line parallel to the active face of the object.

Applications

In the previous section, alternative embodiments of the invention were described. In this section, applications in conjunction with which embodiments of the invention may be practiced are shown. Those of ordinary skill within the art can appreciate, of course, that the invention is not limited to use with the applications described in this section. The applications described herein are only representative and exemplary of the applications with which embodiments of the invention may be practiced.

Figure 4A:
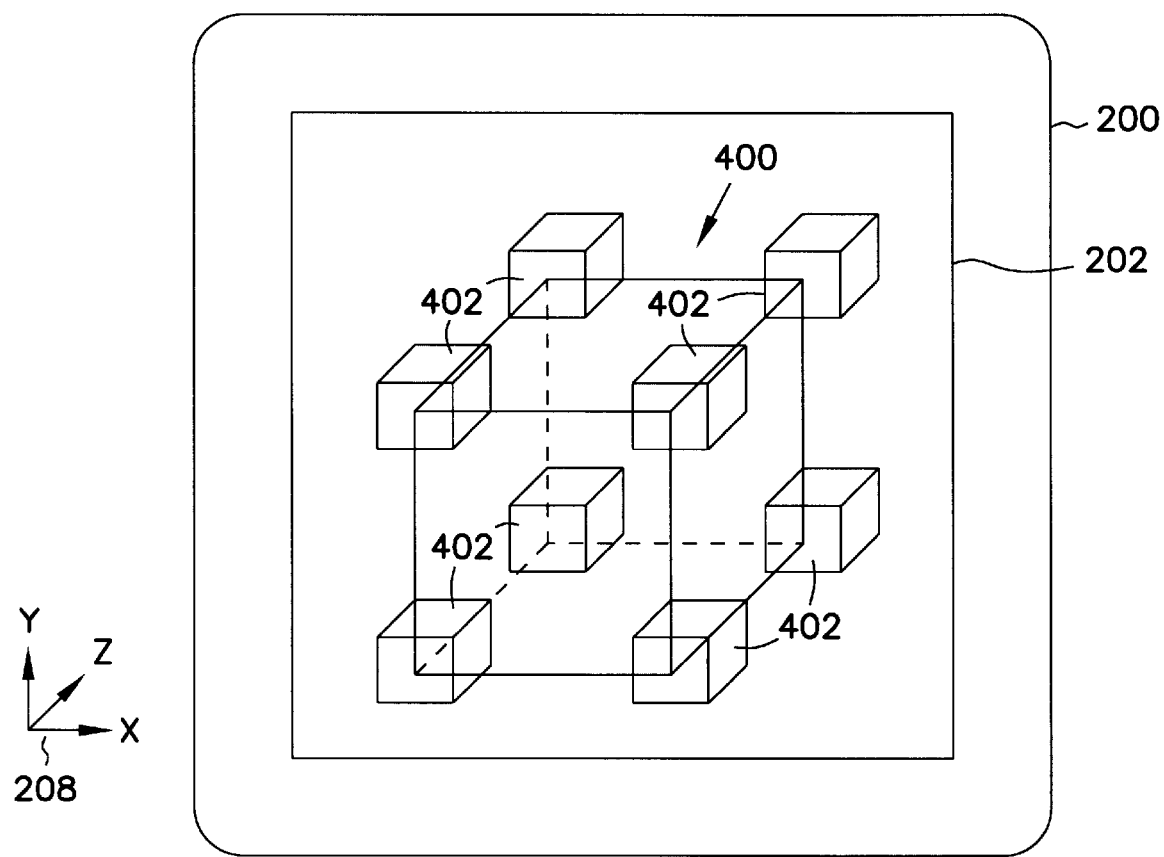
Figure 4B:
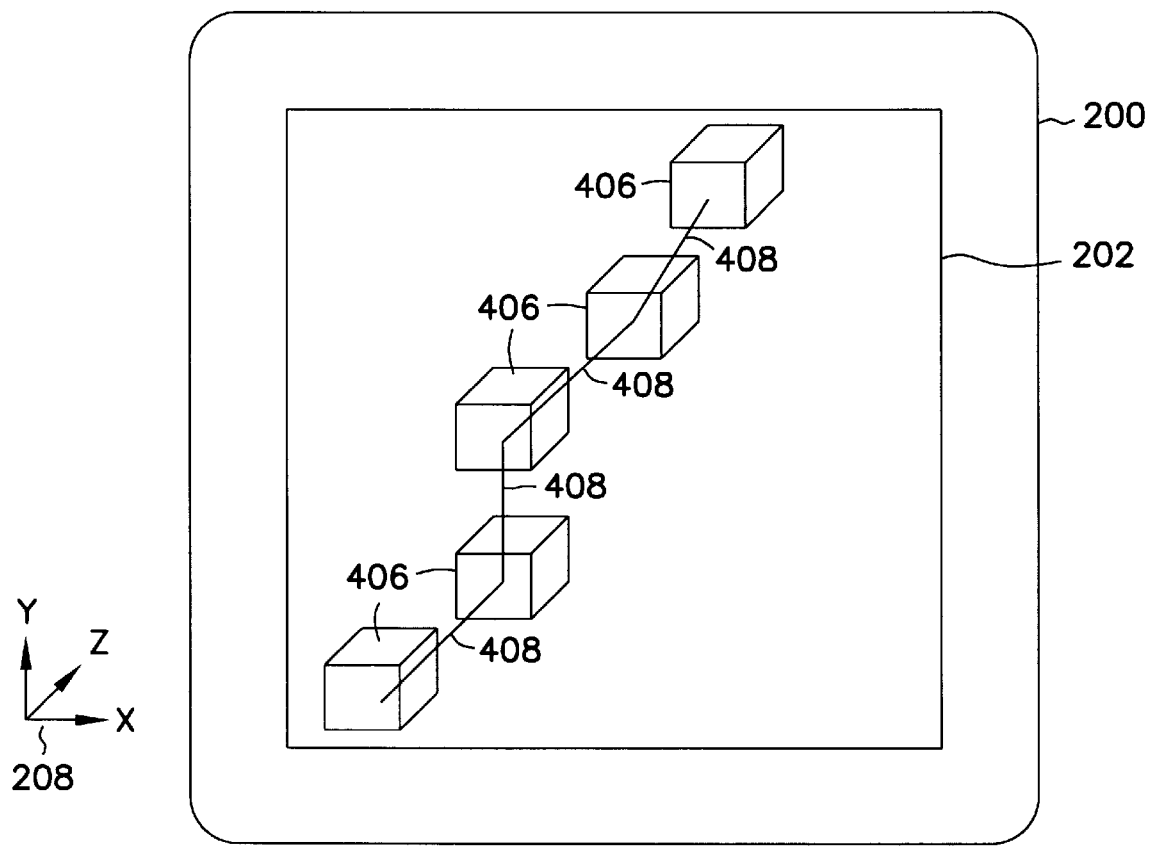
Figure 4C:
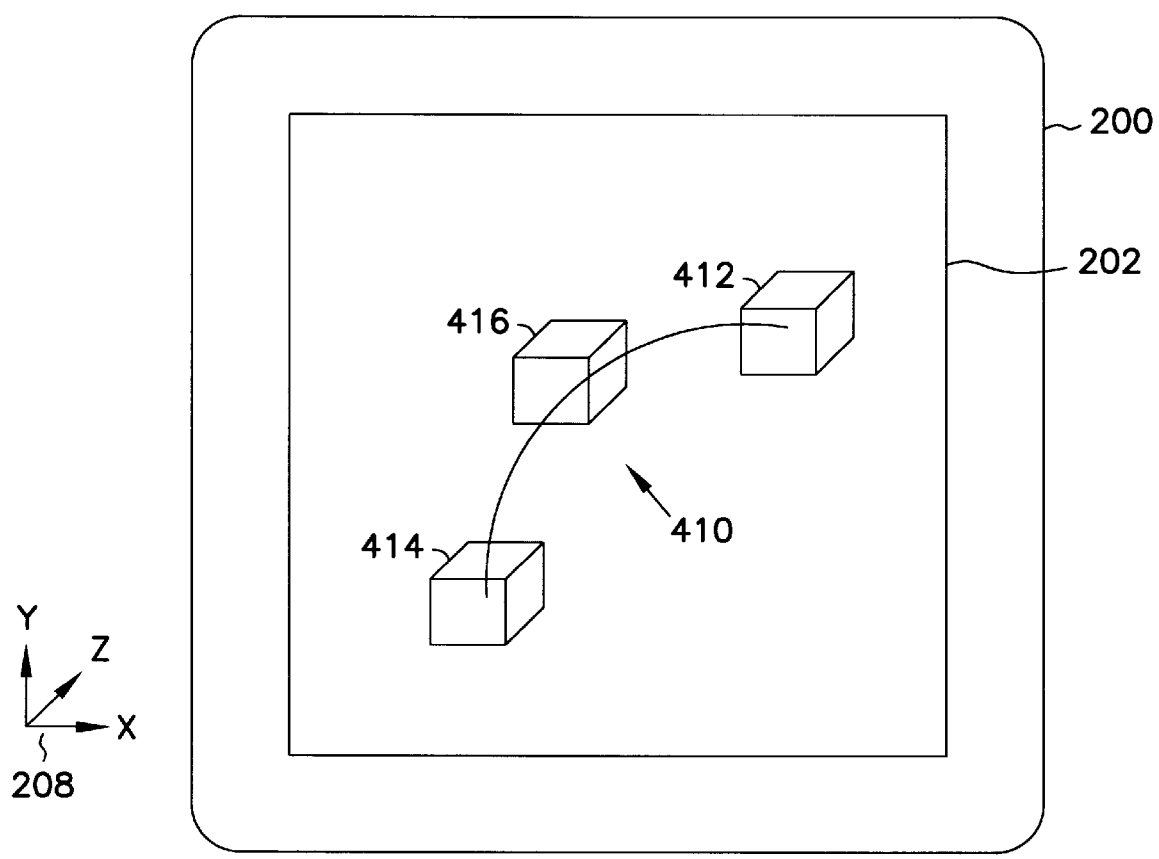

Referring first to FIG. 4(*a*), an embodiment of the invention may be used to create a three-dimensional scale manipulator. With respect to three-dimensional object 400, which has a given shape and proportions, eight control polyhedras 402 are positioned at the vertices of object 400. As a user clicks and drags a given control polyhedra 402 to a new position, object 400 changes shape, and its proportions also change, in accordance with the movement of the given control polyhedra 402. Thus, the application of FIG. 4(*a*) shows how control polyhedras according to an embodiment of the invention may be used to resize and reproportion three-dimensional objects.

Referring next to FIG. 4(*b*), an embodiment of the invention may be used in conjunction with a polyline editor □ i.e., the interactive construction and editing of a sequence of polyline points. Polyline 404 exists in three dimensions, and is constructed of a number of line segments 408. That is, polyline 404 is a sequence of three-dimensional points, each having a corresponding control polyhedra 406, with consecutive points connected by a line segment 408. Thus, moving a control polyhedra 406 in accordance with an embodiment of the invention permits movement of the corresponding point, such that one or more line segments 408 attached to this point also correspondingly change.

Referring finally to FIG. 4(*c*), an embodiment of the invention may be used in conjunction with a control point editor. Control points appear in applications as a manner by which drawing objects such as curves, surfaces, and freeform deformations may be edited. Thus, curve 410 may be edited by having its first end moved by movement of control polyhedra 414 (positioned over a first control point of curve 410), its second end moved by movement of control polyhedra 412 (positioned over a second control point of curve 410), or the curve itself changed by movement of control polyhedra 416 (positioned over a third control point of curve 410). It is believed that control polyhedras are an ideal mechanism for the editing the positions of these control points within a three-dimensional space.

Applications in which embodiments of the invention may be practiced have been described. One application is a scale manipulator, in which control polyhedras govern the size and proportion of a related three-dimensional object. Another application is a polyline editor, in which the points making up the polyline may be moved by moving of corresponding control polyhedras. Still another application is a control point editor, in which the control points of a curve, surface, or freeform deformation may be moved by moving corresponding control polyhedras. The invention is not limited to a particular application, however.

Conclusion

A control polyhedra for a three-dimensional environment as provided by a user interface has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A user interface for a three-dimensional (3D) environment comprising:
   a pointer, movement of which is controlled by a pointing device; and,
   a control polyhedra having at least one visible face, each visible face parallel to a plane of the three-dimensional (3D) environment,
   wherein selecting a visible face using the pointer permits subsequent movement of the control polyhedra in the plane to which the visible face is parallel.

2. An operating system for a computer comprising a graphical user interface comprising:
   a pointer, movement of which is controlled by a pointing device; and,
   a control polyhedra having at least one visible face, each visible face parallel to a plane of a three-dimensional (3D) environment,
   wherein selecting a visible face using the pointer permits subsequent movement of the control polyhedra in the plane to which the visible face is parallel.

3. A computerized system comprising:
   a pointing device;
   a three-dimensional (3D) user interface having three planes of movement perpendicular to one another;
   a pointer within the three-dimensional user interface, movement of which is controlled by the pointing device; and,
   a control polyhedra having at least one visible face, each visible face parallel to each plane of movement of the three-dimensional user interface,
   wherein selecting a visible face using the pointer permits subsequent movement of the control polyhedra in the plane to which the visible face is parallel.

4. A computer-readable medium having a computer program stored thereon to provide a suitably equipped computer a user interface for a three-dimensional (3D) environment comprising:
   a pointer, movement of which is controlled by a pointing device; and,
   a control polyhedra having at least one visible face, each visible face parallel to a plane of the three-dimensional (3D) environment,
   wherein selecting a visible face using the pointer permits subsequent movement of the control polyhedra in the plane to which the visible face is parallel.

5. The user interface of claim 4, wherein the default size is smaller than the selected size.

6. The user interface of claim 1, wherein the control polyhedra has a constant size regardless of the movement of the control polyhedra.

7. The user interface of claim 1, wherein the control polyhedra has a size that varies according to the movement of the control polyhedra in one particular plane of the three-dimensional (3D) environment.

8. The user interface of claim 1, wherein the movement of the control polyhedra is constrained to a line within the plane of the visible face selected.

9. The user interface of claim 1, wherein the control polyhedra also has at least one hidden face, each hidden face parallel to a plane of the three-dimensional (3D) environment.

10. The user interface of claim 9, wherein the at least one hidden face comprises three hidden faces.

11. The user interface of claim 10, wherein the at least one visible face comprises three visible faces, and wherein upon the selection of the visible face using the pointer the control polyhedra further comprises:
    a first set of two arrows parallel to the selected visible face and extending from two of the hidden faces perpendicular to the selected visible face; and,
    a second set of two arrows parallel to the selected visible face and extending from two of the visible faces perpendicular to the selected visible face.

12. The user interface of claim 1, further comprising a three-dimensional object to which the control polyhedra is related, the three-dimensional object having a shape and proportions, the control polyhedra used to change the shape and the proportions of the three-dimensional object.

13. The user interface of claim 1, further comprising a polyline editor utilizing the control polyhedra to edit a sequence of polyline points.

14. The user interface of claim 1, further comprising a control point editor utilizing the control polyhedra to set at least one control point of a drawing object.

15. The user interface of claim 14, wherein the drawing object is selected from the group substantially consisting of a curve, a surface, and a freeform deformation.

16. An operating system for a computer comprising a graphical user interface comprising:
    a pointer, movement of which is controlled by a pointing device; and,
    a control polyhedra having at least one visible face, each visible face parallel to a plane of a three-dimensional (3D) environment,
    selection of a visible face using the pointer permitting subsequent movement of the control polyhedra in the plane to which the visible face is parallel.

17. The operating system of claim 16, wherein the at least one visible face comprises three visible faces.

18. The operating system of claim 16, wherein the control polyhedra comprises a cube.

19. The operating system of claim 16, wherein the control polyhedra also has a hidden face parallel to each plane of the three-dimensional (3D) environment.

20. The operating system of claim 19, wherein the at least one visible face comprises three visible faces, and wherein upon the selection of the visible face using the pointer the control polyhedra further comprises:
    a first set of two arrows parallel to the selected visible face and extending from two of the hidden faces perpendicular to the selected visible face; and,
    a second set of two arrows parallel to the selected visible face and extending from two of the visible faces perpendicular to the selected visible face.

21. A computerized system comprising:
    a pointing device;
    a three-dimensional (3D) user interface having three planes of movement perpendicular to one another;
    a pointer within the three-dimensional user interface, movement of which is controlled by the pointing device; and,
    a control polyhedra having at least one visible face, each visible face parallel to each plane of movement of the three-dimensional user interface,
    selection of a visible face using the pointer permitting subsequent movement of the control polyhedra in the plane of movement to which the visible face is parallel.

22. The computerized system of claim 21, wherein the pointing device comprises a button, such that the visible face is selected using the pointer by pressing the button.

23. The computerized system of claim 21, wherein the control polyhedra comprises a cube, the at least one visible face of the control polyhedra comprises three visible faces, and the control polyhedra also has a hidden face parallel to each plane of the three-dimensional (3D) environment.

24. The computerized system of claim 23, wherein upon the selection of the visible face using the pointer the control polyhedra further comprises:
   a first set of two arrows parallel to the selected visible face and extending from two of the hidden faces perpendicular to the selected visible face; and,
   a second set of two arrows parallel to the selected visible face and extending from two of the visible faces perpendicular to the selected visible face.

25. A computer-readable medium having a computer program stored thereon to provide a suitably equipped computer a user interface for a three-dimensional (3D) environment comprising:
   a pointer, movement of which is controlled by a pointing device; and,
   a control polyhedra having at least one visible face, each visible face parallel to a plane of the three-dimensional (3D) environment,
   selection of a visible face using the pointer permitting subsequent movement of the control polyhedra in the plane to which the visible face is parallel.

26. The computer-readable medium of claim 25, wherein the computer-readable medium is selected from the group essentially consisting of: a floppy disk, a compact-disc read-only-memory (CD-ROM).

27. The computer-readable medium of claim 25, wherein the control polyhedra comprises a cube, the at least one visible face of the control polyhedra comprises three visible faces, and the control polyhedra also has a hidden face parallel to each plane of the three-dimensional (3D) environment.

28. The computer-readable medium of claim 27, wherein upon the selection of the visible face using the pointer the control polyhedra further comprises:
   a first set of two arrows parallel to the selected visible face and extending from two of the hidden faces perpendicular to the selected visible face; and,
   a second set of two arrows parallel to the selected visible face and extending from two of the visible faces perpendicular to the selected visible face.

29. A user interface for a three-dimensional (3D) environment comprising:
   a pointer; and,
   a control cube comprising:
      a set of three hidden faces;
      a set of three visible faces including an active face over which the pointer is positioned;
      a first set of two arrows parallel to the active face and extending from two of the set of three hidden faces perpendicular to the active face;
      a second set of two arrows parallel to the active face and extending from two of the three visible faces perpendicular to the active face,
   wherein the control cube is movable within a plane parallel to the active face.

* * * * *